United States Patent
Osawa et al.

(10) Patent No.: US 7,502,612 B2
(45) Date of Patent: Mar. 10, 2009

(54) DUAL MODE WIRELESS COMMUNICATION DEVICE USING IRDA THAT DOESN'T COMPLY WITH IRDA STANDARD AS THE DEFAULT MODE AND THE SECOND MODE IS COMPLIANT WITH IRDA STANDARD

(75) Inventors: Shohei Osawa, Tenri (JP); Hitoshi Naoe, Kitakatsuragi-gun (JP); Fumihiro Fukae, Sakurai (JP); Koji Sakai, Osaka (JP)

(73) Assignee: Sharp Kabushiki Kaisha, Osaka-Shi (JP)

(*) Notice: Subject to any disclaimer, the term of this patent is extended or adjusted under 35 U.S.C. 154(b) by 291 days.

(21) Appl. No.: 11/138,264

(22) Filed: May 27, 2005

(65) Prior Publication Data
US 2005/0271022 A1 Dec. 8, 2005

(30) Foreign Application Priority Data
May 31, 2004 (JP) .............................. 2004-161937

(51) Int. Cl.
*H04Q 7/20* (2006.01)
(52) U.S. Cl. .............. 455/426.2; 455/127.4; 455/552.1; 455/554.1; 455/554.2
(58) Field of Classification Search ................ 370/338, 370/302, 322, 329, 341, 348; 455/41.1, 41.2, 455/41.3, 73, 88, 91, 151.2, 418, 115.3, 127.4, 455/133, 134, 135, 176.1, 180.1, 188.1, 426.1, 455/435.2, 550.1, 553.1; 359/135, 350; 379/56.1, 379/56.3
See application file for complete search history.

(56) References Cited

U.S. PATENT DOCUMENTS 5,585,952 A * 12/1996 Imai et al. .................... 398/103

(Continued)

FOREIGN PATENT DOCUMENTS

CN 1167380 A 12/1997

(Continued)

OTHER PUBLICATIONS

"Infrared Data Association, Serial Infrared Link Access Protocol (IrLAP)" (Timothy Williams et al. Version 1.1, Jun. 16, 1996, p. 1-116).

*Primary Examiner*—Dwayne D Bost
*Assistant Examiner*—James D Ewart
(74) *Attorney, Agent, or Firm*—Birch, Stewart, Kolasch & Birch, LLP (57) ABSTRACT

A data transmitter includes (a) first communication means performing data transmission according to IrDA Standard, (b) second communication means performing data transmission that does not comply with the IrDA Standard and (c) means for switching between a process performed by the first communication means and a process performed by the second communication means. The second communication means includes (a) management information transmitting means for sending management information for managing transmission target data according to a data transmission prosecution command from a user, (b) communication capability information receiver means for receiving communication capability information indicating communication capability of a device that has responded to the transmission of the management information and (c) data transmission means for transmitting a packet including the transmission target data on the basis of the communication capability information. This can make the communication time shorter than the conventional communication time in infrared communication.

11 Claims, 6 Drawing Sheets

U.S. PATENT DOCUMENTS

| | | |
|---|---|---|
| 6,154,298 A | 11/2000 | Tamagawa |
| 6,297,802 B1 | 10/2001 | Fujioka |
| 6,735,245 B1 | 5/2004 | Palm |
| 6,842,433 B2 | 1/2005 | West et al. |
| 7,069,059 B2 | 6/2006 | Osawa |
| 2002/0065065 A1* | 5/2002 | Lunsford et al. ............ 455/411 |
| 2002/0196812 A1 | 12/2002 | Yamaguchi et al. |
| 2003/0114107 A1* | 6/2003 | Aoyagi ....................... 455/41 |
| 2004/0054796 A1 | 3/2004 | Kikuchi et al. |
| 2005/0071733 A1 | 3/2005 | Fukae et al. |
| 2006/0250973 A1 | 11/2006 | Trott |
| 2007/0064733 A1 | 3/2007 | Osawa et al. |

FOREIGN PATENT DOCUMENTS

| | | |
|---|---|---|
| CN | 1394029 A | 1/2003 |
| JP | 4-839 | 1/1992 |
| JP | 9-312674 | 12/1997 |
| JP | 10-98435 A | 4/1998 |
| JP | 2000-032000 | 1/2000 |
| JP | 2002-223466 A | 8/2002 |
| JP | 2003-258880 A | 9/2003 |
| JP | 2004-94555 A | 3/2004 |
| JP | 2004-343246 A | 12/2004 |

* cited by examiner

DUAL MODE WIRELESS COMMUNICATION DEVICE USING IRDA THAT DOESN'T COMPLY WITH IRDA STANDARD AS THE DEFAULT MODE AND THE SECOND MODE IS COMPLIANT WITH IRDA STANDARD

This Nonprovisional application claims priority under 35 U.S.C. § 119(a) on patent application Ser. No. 161937/2004 filed in Japan on May 31, 2004, the entire contents of which are hereby incorporated by reference.

FIELD OF THE INVENTION

The present invention relates to a data transmitter, a data receiver and a communication system, each of which performs wireless communication using an infrared ray as a communication medium.

BACKGROUND OF THE INVENTION

Presently various methods are proposed as methods for connecting information technology devices. A wireless communication using an infrared ray, among others, is widely used because of the advantages (1) through (3) set forth below:

(1) There is no restriction by laws and, thus, it is possible to establish a world-wide universal communication method is possible.

(2) A transmitter/receiver can be small in size, light in weight and low in cost, and the data transmission/reception can be performed with low power consumption.

(3) Linear propagation of light causes no unnecessary information leakage and hardly allows interference. Thus, utilization of space is efficient.

Especially, IrDA (Infrared Data Association) Standard, which is standardized by IrDA (IrDA is an industry organization), defines maximum communication speed to be 4 Mbps. The standard is extensively applied to PCs (personal computers), handy phones, portable information terminals and the like. (Herein, "IrDA Standard" is denoted simply by "IrDA" as generally called.) The IrDA is disclosed in the following Document 1.

[Document 1]

Infrared Data Association, Serial Infrared Link Access Protocol (Version 1.1), Published on Jun. 16, 1996

According to the IrDA, communication protocols have a layered structure. The communication protocols include a SIR (Serial Infrared) layer, an IrLAP (IrDA Link Access Protocol) layer, an IrLM-LMP (IrDA Link Management Protocol) layer and the like. The SIR layer provides a physical rule. The IrLAP layer establishes a transmission channel. IrLM-LMP (i) performs communication processing of an application that operates in a multi-task environment and (ii) transmits a characteristic and a function of a communication-counter part device.

The IrLAP layer is based on a half duplex procedure of a HDLC (a High level Data Link Control) defined by the ISO (International Organization for Standardization). In order to establish a transmission channel of high quality, the IrLAP layer performs following operations.

[Connectionless-Type Service]

The IrLAP layer searches a device(s) present in a region within a communication range and obtains an address(es) of the device(s) in the region within the communication range.

In the case where plural devices have the same addresses, the IrLAP layer applies a method (means) for dissolving the overlap of the addresses so that each of the devices in the region within the communication range respectively has an address specific thereto.

The IrLAP layer performs broadcast to all devices in the region within the communication range.

[Connection-Type Service]

The IrLAP layer establishes a transmission channel (connection) to connect a device, to which the IrLAP layer belongs, with another device that is a target of the connection.

When the connection is being established, the IrLAP layer negotiates communication speed information, data size in a frame transmitted after establishment of the connection, and the like.

The IrLAP layer adds a sequence number to each frame of data to be transmitted and guarantees an order of the sequence.

The IrLAP layer performs transmission error detection and recovery control, thereby guaranteeing data transmission of high reliability.

When a receiver becomes too busy to receive data, the IrLAP layer requests busy control to a sender and restricts transmission of frames.

The layer releases the established connection.

Moreover, the IrLMP layer (IrLM-LMP layer) includes a LM-MUX (IrLMP Multiplexer) layer and a LN-IAS (LrLMP Information Access Service) layer. The LM-MUX layer supports the communication between applications and performs following operations:

[Processes Performed By LM-MUX Layer]

By controlling the IrLAP layer, the LM-MUX layer searches a device(s) present in the region within the communication range.

By controlling the IrLAP layer, the LM-MUX layer establishes a transmission channel connecting a device, to which the IrLAP layer belongs, with another device that is a target of the connection.

The LM-MUX layer adds a header to transmission data, thereby clarifying the sender at the receiver.

The LM-MUX layer allots received data according to where the data is to be forwarded, and forwards the data to an upper application to which the data is to be forwarded.

The layer performs exclusive access control and multiplex control.

The LM-MUX layer releases the connections via the IrLAP layer.

The LN-IAS layer performs a process for transmitting, to the application, information on a characteristic and a function of the communication-counterpart device. This allows the upper application to communicate with a device suitable for a specific purpose such as storing data, printing data or the like.

By the processes explained above, the IrDA makes it possible to dynamically discover a communicable device(s) present in the region within the communication range and to easily provide a communication environment suitable for each application.

The IrDA can easily provide a communication environment according to each application by carrying out the processes. This broadens a range of application usage.

However, communication speed for searching a device(s), identifying the device(s) and negotiating with the device(s), is defined to be relatively low. Moreover, a waiting time accompanies these processes. As the result, these processes become causes of increase in time for communication processing as a whole.

SUMMARY OF THE INVENTION

An object of the present invention is to provide, in infrared communication, a data transmitter capable of communicating in shorter communication time than the communication time of a conventional transmitter and a data receiver communicating with the data transmitter.

A data transmitter of the present invention includes: a first communication section for performing wireless data communication by an infrared ray according to IrDA Standard; a second communication section for performing, by the infrared ray, wireless data communication that does not comply with the IrDA Standard; and a switching section that switches between a process performed by the first communication section and a process performed by the second communication section, the second communication section including: a management information transmitting section for transmitting, in response to a user's instruction for data transmission, management information for managing transmission target data; a communication capability information receiver section for receiving communication capability information indicating communication capability of a device that has responded to the transmission of the management information; and a data transmitting section for transmitting a packet including the transmission target data, on the basis of the communication capability information.

In the communication complying with the IrDA Standard, the data transmission is performed after a process in which the destination device is searched. However, in infrared communication, the user often transmits data in the state where the light emitting section of the transmitting device is caused to face the light receiving section of the receiving device by the user himself/herself. In this case, the process for searching another communication device is not necessarily required.

Accordingly, the above arrangement includes the switching section that switches between a transmission process, according to the IrDA Standard, performed by the first communication section and a process, which does not comply with the IrDA Standard, performed by the second communication section.

This second communication section transmits the management information for managing the transmission target data in response to the user's data transmission instruction. When communication capability information indicating communication capability of the device that has responded to the transmission of the management information is received, the second communication section transmits a packet including the transmission target data on the basis of this communication capability information. Namely, if there is a device responding to the transmission of the management information, the second communication section determines that the second communication section can communicate with this device and sends the transmission target data to this device. Accordingly, because the communication performed by the second communication section does not carry out a process for searching the destination device, the communication time can be shortened compared with time for the communication, which complies with the IrDA Standard and needs the search process.

In other words, if the process performed by the first communication section and the process performed by the second communication section are switched according to the necessity of the process searching the destination device, the communication time can be shortened. Thus, when this search process is unnecessary, the second communication section carries out infrared communication skipping the search process. As the result, the communication time can be shortened compared with time required by the conventional infrared communication device.

As the communication method in the purpose of shortening the communication time, there is a packet communication method disclosed in the following Document 2. This method is applied to the communication method in which a transmission channel is provided beforehand, but is not applied to infrared communication in which a communication channel is not provided beforehand. Moreover, in Document 2, the "switching section that switches between a process performed by the first communication section and a process performed by the second communication section" is not disclosed.

(Document 2)

Japanese Laid-Open Patent Application 839/1992 (Tokukaihei 4-839 Published on Jan. 6, 1992)

For a fuller understanding of the nature and advantages of the invention, reference should be made to the ensuing detailed description taken in conjunction with the accompanying drawings.

DESCRIPTION OF THE EMBODIMENTS

First Embodiment

Referring to FIGS., an exemplary embodiment of the present invention is explained as follows. In this embodiment, a case in which image data stored in a camera handy phone is transmitted to a PC (Personal Computer) is exemplified for the explanation.

Figure 1:
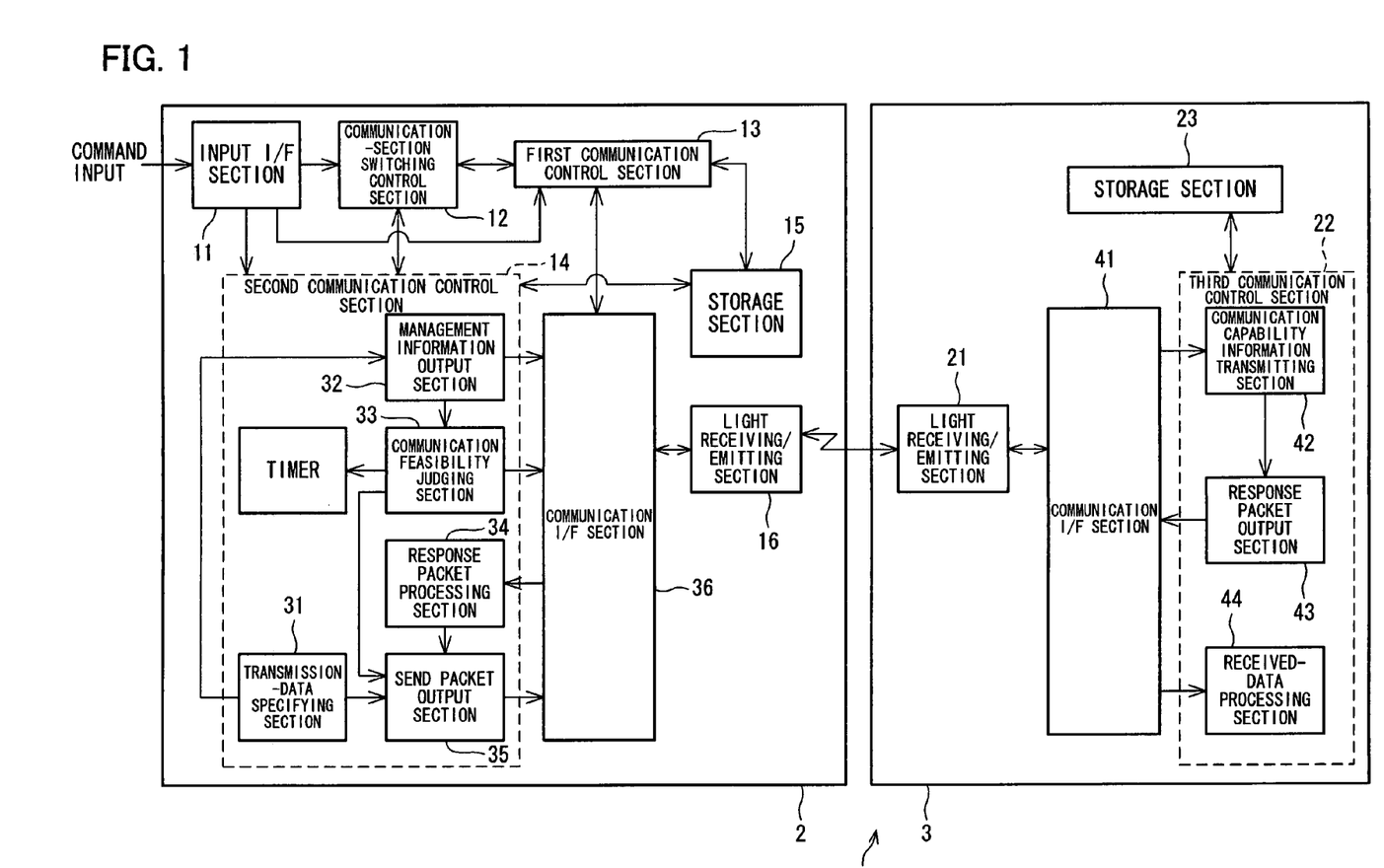
FIG. 1 is a functional block diagram of a communication system in an exemplary embodiment of the present invention.

FIG. 1 is a functional block diagram of a communication system 1 including an infrared communication device (hereinafter, denoted as an "image transmitter") 2 provided in the handy phone and an infrared communication device (hereinafter, denoted as an "image receiver") 3 provided in the PC.

As mentioned above, the image transmitter (a data transmitter) 2 is a block included in the camera handy phone. The image transmitter 2 has a function of performing wireless data communication by the use of an infrared ray as a communication medium. The image receiver 3 (a data receiver) is a block included in the PC. The image receiver 3 has a function of performing wireless data communication by the use of the infrared ray as a communication medium.

The image transmitter 2 and the image receiver 3 have functions of negotiating with each other before transmission of image data. To explain this negotiation briefly, the image transmitter 2 firstly sends, to the image receiver 3, management information (for example, name of a file and the like) of the image data that is a transmission target (a target for the transmission). The image receiver 3 that has received this management information sends, to the image transmitter 2, communication capability information indicating communication capability (for example, maximum acceptable transmission speed and the like) that indicates communication capability of the image receiver 3. This negotiation makes it possible for the image transmitter 2 to acknowledge the communication capability of the image receiver 3 beforehand. As the result, the image transmitter 2 can, for sure, carry out the transmission process by adjusting the transmission process of the image data to the communication capability of the image receiver 3. Moreover, by receiving the communication capability information from the image receiver 3 in response to the transmission of the management information, the image transmitter 2 can acknowledge that at least a device, to which the image transmitter 2 can send data, is present in a region within a communication range. The following is a detailed explanation of an arrangement realizing this negotiation.

First of all, each block included in the image transmitter 2 is explained in details. The image transmitter 2, as illustrated in FIG. 1, includes an input I/F (interface) section 11, a communication-section switching control section (switching means, a section for controlling switchover of communication means) 12, a first communication control section 13, a second communication control section 14, a storage section 15, a light receiving/emitting section 16 and a communication I/F (interface) section 36.

The input I/F section 11 is a block constituting an interface into which a command from a user of the handy phone is inputted. Here, in this embodiment, the user, by operating an operational button on the handy phone, inputs a decision command for deciding image data for transmission and a transmission prosecution command. The decision command is transmitted to the first and the second communication control sections 13 and 14 from the input I/F section 11. The transmission prosecution command is transmitted to the communication-section switching control section 12 from the input I/F section 11.

The first communication control section 13 is a block that, when the first communication section obtains the decision command from the input I/F section 11, controls (i) reading, from the storage section 15, image data corresponding to the data determined by the user, on the basis of this decision command and (ii) sending this image data to the image receiver 3, according to a procedure provided by the IrDA Standard.

The second communication control section 14 is a block that, when the second communication control section 14 obtains the decision command from the input I/F section 11, controls (i) reading, from the storage section 15, the image data corresponding to the image determined by the user, on the basis of this decision command, and (ii) sending this image data to the image receiver 3. The second communication control section 14 is a block realizing infrared communication that is not stipulated in the IrDA Standard and the details of the second communication control section 14 is explained later.

The storage section 15 includes a nonvolatile storage section (means), for example, a flash memory or the like. Contents stored in this storage section 15 include image data captured by a camera of the handy phone, a control program, an OS (Operation System) program, and various kinds of information in the handy phone.

When the communication-section switching control section 12 obtains the transmission prosecution command from the input I/F section 11, the communication-section switching control section 12 firstly activates the second communication control section 14 to control transmitting the image data. Then, in the case where the second communication control section 14 cannot carry out the transmission of the image data, the communication-section switching control section 12 activates the first communication control section 13 to control transmitting the image data.

The light receiving/emitting section 16 is a light receiving/emitting module (a light receiving/emitting device) for performing the infrared communication and includes an infrared LED (Light Emitting Diode) for sending data and a photo diode for receiving data. That is, the light receiving/emitting section 16 carries out data transmission by causing the infrared LED to turn On and Off (i.e. to emit light and not to emit light) and carries out data reception using the photo diode for detecting the On and Off of the LED.

The communication I/F section 36 is a block that performs either data reception/transmission of the first communication control section 13 and the second communication section 14 by controlling the light receiving/emitting section 16.

In this embodiment, unless otherwise specified, it is supposed that the user of the handy phone holds the handy phone so as to cause the light receiving/emitting section 16 and the light receiving/emitting section 21 of the image receiver 3 to face each other. This makes it possible for the image transmitter 2 to carry out the infrared communication between the image transmitter 2 and the image receiver 3 even if the image transmitter 2 does not search the image receiver 3 to which the image transmitter 2 is to send the data.

Next, the second communication control section 14 is explained. The second communication control section 14 includes a transmission-data specifying section 31, a management information output section 32, a communication-feasibility judging section 33, a response packet processing section 34 and a send packet output section 35.

The transmission-data specifying section 31 is a block that, when the second communication control section 14 obtains the decision command from the input I/F section 11, (i) generates transmission-target specifying information (information specifying the image data to be transmitted) on the basis of the decision command and (ii) transmits this transmission target specifying information to the management information output section 32 and the send packet output section 35.

Figure 2:
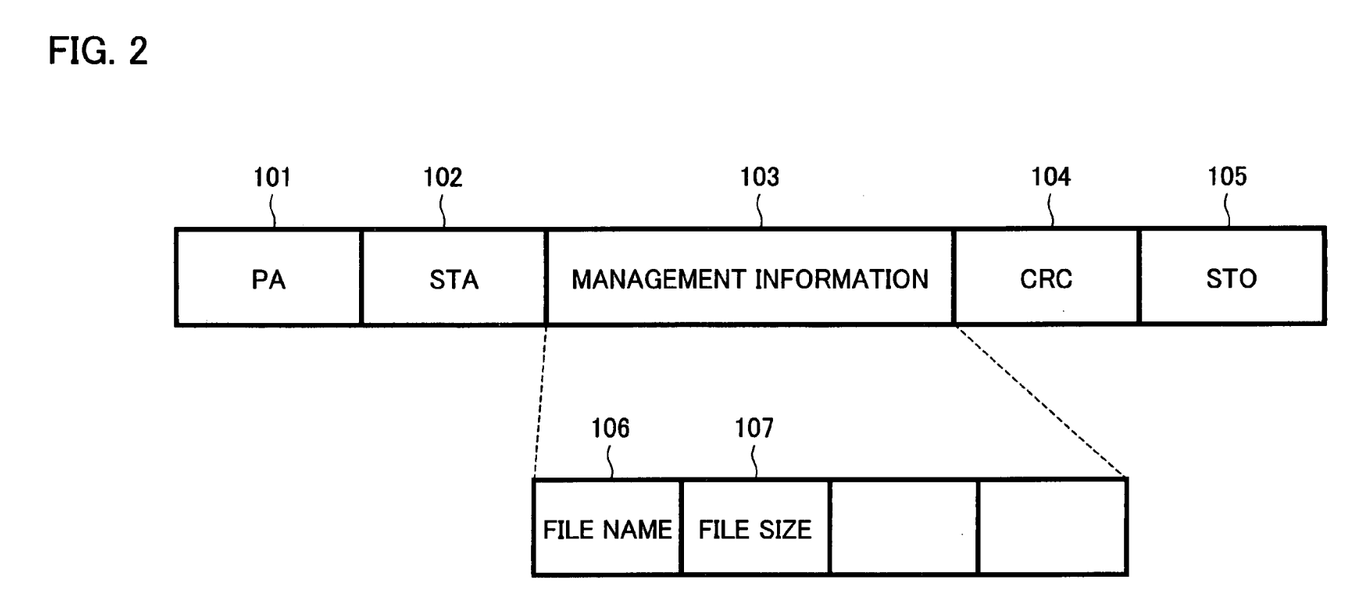
FIG. 2 is a diagram of a data structure of a management packet that a management information output section of FIG. 1 outputs.

The management information output section (means for transmitting management information) 32 (i) reads, out of the storage section 15, a file name and a file size, which are management information for managing the transmission target image data, according to the transmission target specifying information sent from the transmission-data specifying section 31 and (ii) generates a packet (hereinafter, denoted as a "management packet.") containing the file name and the file size. The management information output section 32 sends this management packet to the image receiver 3 via the communication I/F section 36. The management packet includes PA (Preamble) 101, STA (Start Flag) 102, management information 103, CRC (Cyclic Redundancy Check) 104, and STO (Stop Flag) 105. The management information 103 contains data, such as a file name 106, a file size 107 and the like, for managing the transmission target image data.

After transmitting the management packet, the management information output section 32 sends, to the communication-feasibility judging section 33, a signal indicating that the management packet has been transmitted.

The communication-feasibility judging section 33, when a signal indicating the transmission of the management packet is received from the management information output section 32, measures a predetermined time from the management packet transmission by a timer and determines whether or not the communication I/F section 36 has obtained a response packet (explained later) from the image receiver 3 within this predetermined time. If the response packet is obtained within the predetermined time, the communication-feasibility judging section 33 (i) judges that a device capable of sending/receiving data to/from the second communication control section 14 is present within the region of the communication range and (ii) gives, to the send packet output section 35, a command to transmit the image data. On the other hand, if the response packet is not received within the predetermined time, the communication-feasibility judging section 33 (i) judges that there is no device capable of sending/receiving data to/from the second communication control section 14 in the region within the communication range and (ii) gives a command to switch communication protocols to the communication-section switching control section 12.

The response packet processing section (means for receiving communication capability information) 34 is a section that (i) receives a response packet via the communication I/F section 36 and (ii) processes this response packet. To be more specific, the response packet processing section 34 (i) analyzes communication capability of the image receiver 3 on the basis of this response packet, (ii) determines characteristics of the image data transmission, such as length of send data, transmission speed, window size, and minimum turnaround time, and (iii) sends the information of the determined characteristics to the send packet output section 35.

Figure 4:
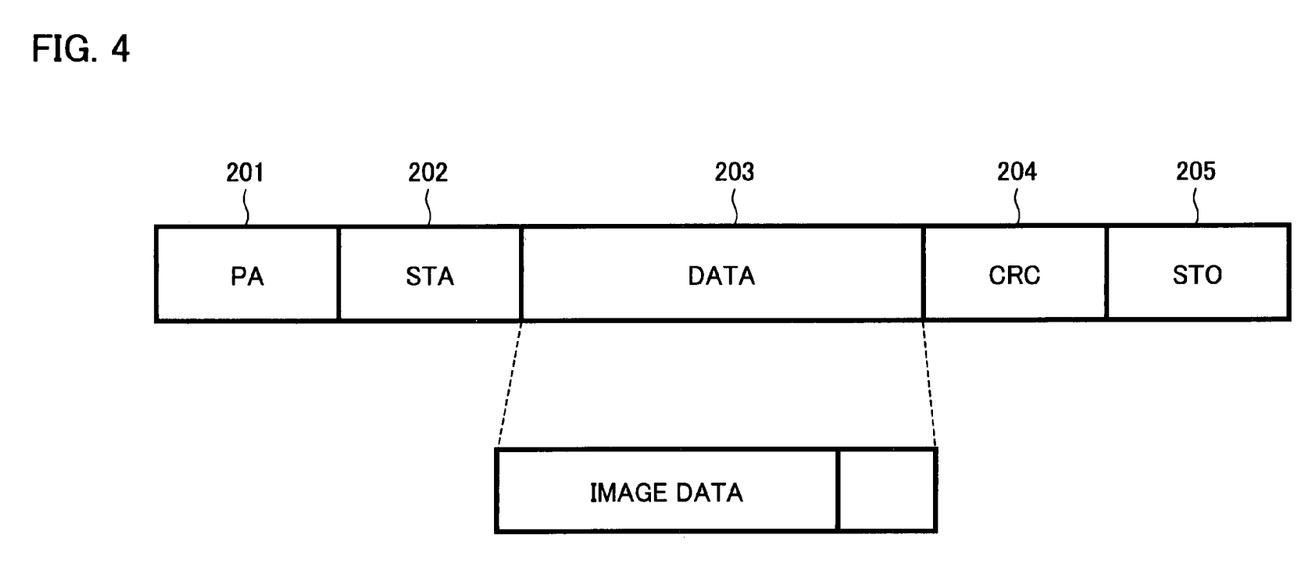
FIG. 4 is a diagram of a data structure of a send packet that a send packet output section of FIG. 1 outputs.

When the command to transmit the data from the communication-feasibility judging section 33 is inputted, the send packet output section (means for transmitting data) 35 (i) reads the transmission target image data out of the storage section 15, on the basis of a transmission target specifying signal inputted by the transmission data specifying section 31 and (b) generates a send packet including this image data. Moreover, the send packet output section 35 generates the send packet so that the send packet conforms to the length of the send data, the transmission speed, the window size and the minimum turnaround time, which are determined by the response packet processing section 34. The send packet output section 35 sends this send packet to the image receiver 3 via the communication I/F section 36. This send packet includes, as illustrated in FIG. 4, PA 201, STA 202, image data 203, CRC 204 and STO 205.

Next, each block included in the image receiver 3 is explained in details. The image receiver 3, as illustrated in FIG. 1, includes a light receiving/emitting section 21, a third communication control section 22, a storage section 23, and a communication I/F section 41.

The third communication control section 22 is a block that, in the PC, controls (i) receiving image data transmitted from the second communication control section 14 in the image transmitter 2 and (ii) storing this image data in the storage section 23. The third communication control section 22 is later explained.

The light receiving/emitting section 21 is a sender/receiver module for performing the infrared communication in the image receiver 3. The storage section 23 is a block constituting a nonvolatile memory in the PC. The storage section 23 includes, for example, a HD (Hard Disk) or a ROM (Read Only Memory).

The communication I/F section 41 is a block that performs the transmission/reception of data in the third communication control section 22 by controlling the light receiving/emitting section 21.

Next, each section in the third communication control section 22 is explained. The third communication control section 22 includes a communication capability information transmitting section 42, a response packet output section 43, and a received data processing section 44.

The communication capability information transmitting section 42 (i) obtains a management packet transmitted from the second communication control section 14 via the communication I/F section 41, (ii) generates, on the basis of the file size indicated by this management packet, communication capability information indicating (a) receivable maximum incoming data length, (b) maximum acceptable transmission speed, (c) window size, (d) minimum turnaround time and the like of the image receiver 3, and (iii) sends this communication capability information to the response packet output section 43.

Figure 3:
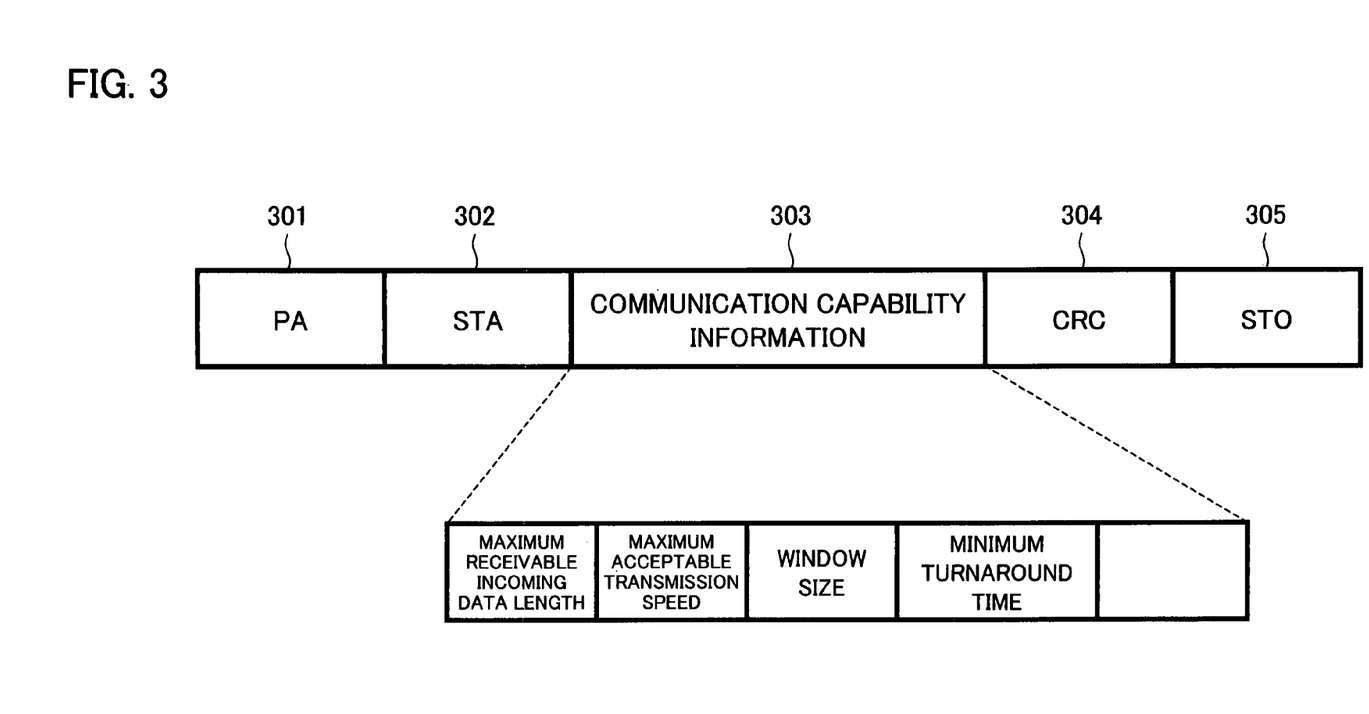
FIG. 3 is a diagram of a data structure of a response packet that a response packet output section of FIG. 1 outputs.

The response packet output section (means for sending communication capability information) 43 is a block that, when the communication I/F section 41 obtains the management information from the second communication control section 14, controls (i) generating a response packet to this management packet on the basis of the communication capability information sent from the communication capability information transmitting section 42 and (ii) transmitting the response packet to the image transmitter 2 via the communication I/F section 41. Moreover, this response packet includes, as illustrated in FIG. 3, PA 301, STA 302, communication capability information 303, CRC 304 and STO 305. The communication capability information 303 includes data such as (a) the receivable maximum incoming data length, (b) the maximum acceptable transmission speed, (c) the window size, (d) the minimum turnaround time, and (e) the like, of the image receiver 3.

The received data processing section 44 is a block which, when the communication I/F section 41 receives the send packet from the second communication control section 14, controls (i) obtaining this send packet from the communication I/F section 41 and (ii) storing, in the storage section 23, the image data included in this send packet.

Figure 5:
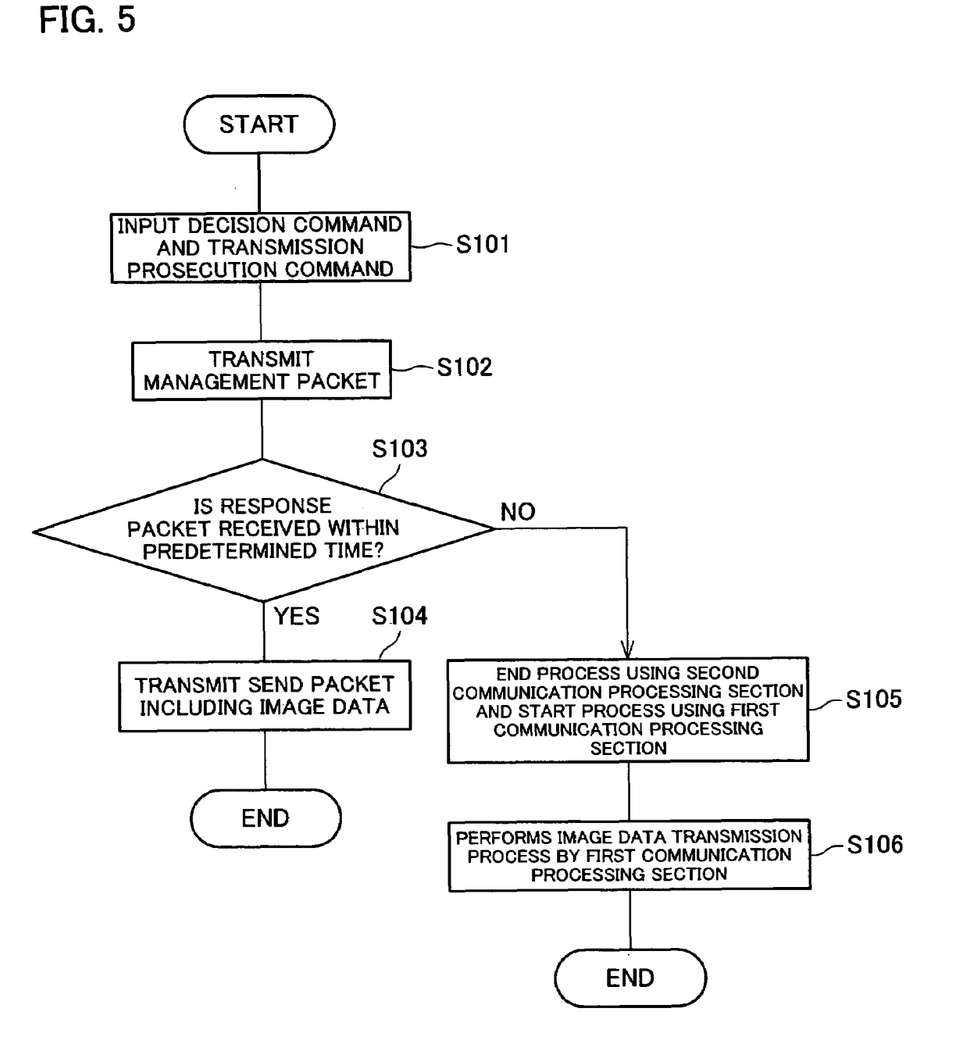
FIG. 5 is a flow chart illustrating a procedure of communication processing in an image transmitter as illustrated in FIG. 1.

Next, a flow of the communication process between the image transmitter 2 and the image receiver 3 as illustrated in FIG. 1 is explained by referring to a flow chart in FIG. 5. Note that the flow chart in FIG. 5 is a flow chart illustrating the flow of the process in the image transmitter 2.

As described above, it is supposed that the user holds the light receiving/emitting section 16 of the image transmitter 2 so as to cause the light receiving/emitting section 16 to face the light receiving/emitting section 21 of the image receiver 3.

First, the user inputs, into the image transmitter 2, the decision command for deciding the transmission target image and the transmission prosecution command (S101) by operating the operational button on the handy phone. This input causes the management information output section 32 to generate the management packet including the file name and the file size for managing the image data that corresponds to the transmission target image. This management packet is transmitted to the image receiver 3 via the communication I/F section 36 and the light receiving/emitting section 16 (S102).

When the image receiver 3 receives the management packet, (i) the communication capability information transmitting section 42 generates the communication capability information of the device including the communication capability information transmitting section 42 and (ii) the response packet output section 43 generates a response packet including the communication capability information. This response packet is transmitted to the image transmitter 2 via the communication I/F section 41 and the light receiving/emitting section 21.

In the image transmitter 2 the communication-feasibility judging section 33 judges whether or not the response packet is received from the image receiver 3 within a predetermined time (S103). If the communication I/F section 36 receives the response packet from the image receiver 3 within the predetermined time (S103, Yes), the communication-feasibility judging section 33 acknowledges the acquisition (obtaining) of the response packet and gives, to the send packet output section 35, a command to transmit the image data.

Further, the send packet output section 35 having received this command reads the transmission target image data out of the storage section 15 and outputs a send packet including this image data (S104). This send packet is transmitted to the image receiver 3 via the communication I/F section 36, and the light receiving/emitting sections 16 and 21 and stored in the storage section 23.

If the communication I/F section 36 at S103 does not obtain the response packet from the image receiver 3 within the predetermined time (No at S103), the communication-feasibility judging section 33 (i) judges that there is no device capable of sending/receiving data to/from the second communication control section 14 in the region within the communication range and (ii) gives, to the communication-section switching control section 12, a command to switch communication protocols. The communication-section switching control section 12 ends a process using the second communication control section 14 and starts a process using the first communication control section 13 (S105). The first communication control section 13 reads the image data out of the storage section 15 on the basis of the decision command obtained from the input I/F section 11 and performs, based on the IrDA Standard, a transmission process of the image data that corresponds to the image specified by the user (S106).

Examples of a possible case where the communication I/F section 36 does not obtain the response packet from the image receiver 3 within the predetermined time are cases in which: (a) the image receiver 3 cannot send the response packet in response to the management information because the image receiver 3 is not a device capable of communicating with the second communication control section 14; and (b) the management information from the image transmitter 2 cannot reach the image receiver 3 because the light receiving/emitting device 16 of the image transmitter 2 and the light receiving/emitting device 21 of the image receiver 3 is not facing each other properly.

The image transmitter 2 includes, as explained above, a communication-section switching control section 12 switching between communication, according to the IrDA Standard, performed by the first communication control section 13 and communication, which does not comply with the IrDA Standard, performed by the second communication control section 14.

The second communication control section 14 transmits, in response to the transmission prosecution command from the user, the management packet including the management information for managing the transmission target image data, and receives, from the image receiver 3 responding to this management packet transmission, the communication capability information indicating the communication capability of the image receiver 3. Moreover, the second communication control section 14, on the basis of this communication capability information, sends the send packet including the transmission target image data. That is, if there is a device responding to the transmission of the management information, the second communication control section 14 determines that the second communication control section 14 can communicate with this device and sends the transmission target image data to this device. Therefore, in the communication performed by the second communication control section 14, a process of searching a device (destination device) to which the data is to be sent can be skipped. Accordingly, compared with the communication based on the IrDA Standard that requires this search process, the communication time can be shortened.

In other words, the communication according to the IrDA Standard performs the process of searching a destination device. However, in the infrared communication, the user often transmits data while a transmitting section of the transmitter faces a receiving section of the receiver. This makes the process of searching the destination device unnecessary. In this case, instead of communicating according to the IrDA Standard, the transmission of the image data is performed by the second communication control section 14 that does not search for the destination device. As the result, the communication time can be shortened.

The communication-section switching control section 12 (i) first tries to perform the communication of the image data by activating the second communication control section 14 and (ii) then switches to the communication using the first communication control section 13 in the case where the communication-feasibility judging section 33 does not detect the reception of the communication capability information within the predetermined time. This gives a priority to the communication using the second communication control section 14 and causes the first communication control section 13 to perform the communication only when the process for searching the destination device is necessary. This shortens the communication time.

Figure 6:
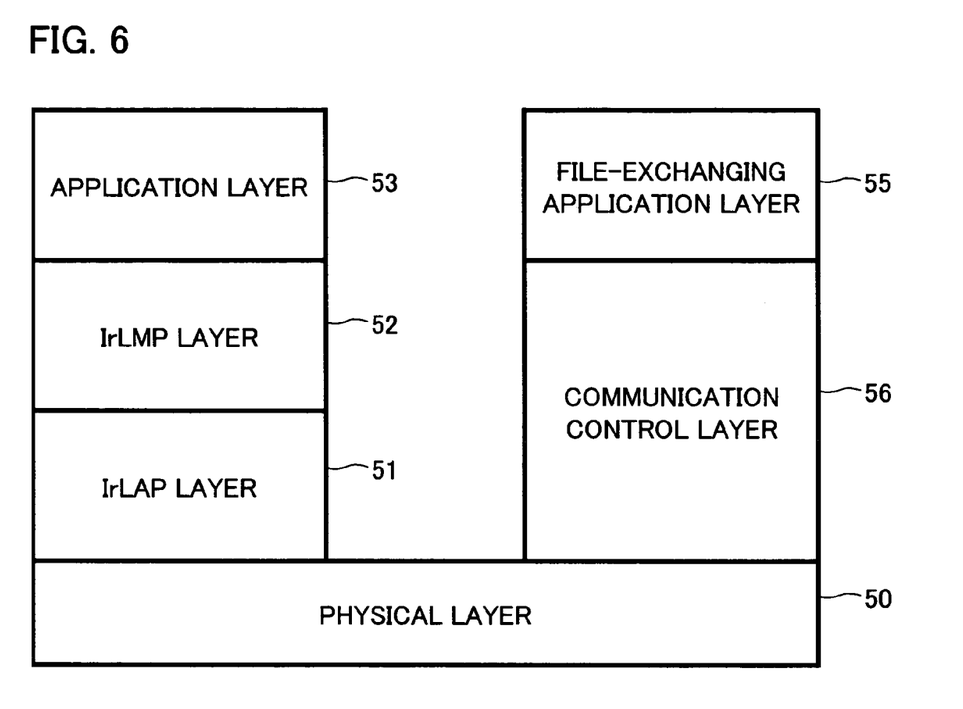
FIG. 6 is a diagram of a layered structure of communication protocols in an image transmitter as illustrated in FIG. 1.

The layered structure of the communication protocols in the data transmitter 2 explained above as an infrared communication device is illustrated in FIG. 6. As illustrated in FIG. 6, the protocols for this communication process include an IrLAP layer 51, an IrLMP layer 52 and an application layer 53 above a physical layer 50 in this order. Moreover, a communication control layer 56 and a file-exchanging application layer 55 are also included in this order above the physical layer 50.

The physical layer 50 is a layer corresponding to the light receiving/emitting section 16 and provides a data transmitting section (means) using an infrared ray as a communication medium. The IrLAP layer 51 and the IrLMP layer 52 respectively are equivalent to an IrLAP layer and an IrLMP layer explained in the background of the invention. The layers 51 and 52 are the layers defining communication protocols in the IrDA Standard. The application layer 53 is a layer providing, to each individual application, an interface for a communication service.

The communication control layer 56 is a layer equivalent to the second communication control section 14. The communication control section 56 performs, as mentioned above, (a) generation and transmission of the management packet, (b) reception of the response packet from a device that has responded to the management packet, (c) construction of a packet of data size that the receiver can receive and so on. Further, the communication control layer 56, other than these processes, can (a) add a sequence number to each frame including data that is to be transmitted continuously, (b) guarantee the processing order, (c) allotting the received data and (d) perform a process of passing (forwarding) the data to the file-exchanging application layer 55 that is an upper layer.

The file-exchanging application layer 55 is a layer providing a one-way data transmission service, which does not need data synchronization, such as file exchange.

The light receiving/emitting sections 16 and 21 are preferably light receiving/emitting devices for the IrDA Standard. The light receiving/emitting device for the IrDA Standard is a mass-produced device and, thus, the device can be obtained at low cost. Accordingly, if the light receiving/emitting sections 16 and 21 are made of the light receiving/emitting device for the IrDA Standard, the cost can be reduced.

In the case where the communication I/F section 36 does not obtain the response packet from the image receiver 3 within the predetermined time, the communication-feasibility judging section 33 determines that there is no device capable of receiving/sending data from/to the second communication control section 14. In this case, the user can acknowledge for sure that there is no device to which data can be transmitted in the region within the communication range on condition that a notification section (means for notifying) is provided for notifying the user that no device, which can receive data transmitted by the second communication control section 14, exists in the region within the communication range. Examples of the section (means) for this notification encompass a display device performing warning display, a speaker giving a warning notice and the like.

In this exemplary embodiment explained above, the transmission target is the image data. However, the transmission target is not limited to the image data but may be, for example, document data.

The data, information or the like thus received by the communication I/F sections 36 and 41 may be subjected to a process using a CDR (Clock Data Recovery circuit), thereby demodulate the received data, information or the like.

Portable communication devices such as a note PC, a PDA (Personal Digital Assistant), a handy phone (such as a cellular phone), a digital camera and the like are preferable as the image transmitter 2 mentioned above. Devices capable of processing and storing received data are preferable as the image receiver 3. Examples of such a device capable of processing and storing received data encompass a note PC, a PC, a television, a printer, a recording device, a portable hard disk, an audio player and the like.

An arrangement of the image transmitter 2 may not have the first communication control section 13 and the communication-section switching control section 12. In this case, both of the decision command and the transmission prosecution command, which are inputted by the input I/F section 11, are transmitted to the second communication control section 14. The second communication control section 14 that has received these commands transmits the send packet including the image data to the image receiver 3 through the procedure S102 to S104. In this arrangement, the image data transmission is performed by the second communication control section 14 that does not search the destination device. Accordingly, compared with the prosecution of the infrared communication according to the IrDA Standard, the communication time can be shortened.

In this arrangement, it is preferable to provide the notification section (for example, a display device, a speaker, a flashing signal and the like). With this, in the case where it is judged that the second communication control section 14 have not received the response packet within the predetermined time after the transmission of the management packet, it is possible to notify the user that no communicable device is present in the region within the communication range. This makes it possible for the user to acknowledge that the communication has not taken place.

The communication-section switching control section 12, the first communication control section 13, the second communication control section 14 and the third communication control section 22 may be attained by a combination of a program for realizing the above-mentioned function and hardware (a computer) for executing the program.

In this case, the program stored in a storage section (storage means) such as a ROM (Read Only Memory) or the like may be arranged so that the program is executed by access of a microprocessor (not illustrated in FIGS.). The program also may be arranged so that the program is executed by reading out the stored program and then expanding the program in a volatile memory such as a RAM (Random Access Memory) or the like. The program read out here is stored in a body of the device beforehand.

The program medium mentioned above in this case is a recording medium that is arranged so that the recording medium can be separated from the body of the device, and may be such a medium which fixedly hold the program. The examples of the recording medium are (a) tapes such as a magnetic tape, cassette tape and the like, (b) disks such as (i) magnetic disks including a Floppy (registered trademark) disk, a hard disk and the like, and (ii) optical disks including a CD-ROM (Compact Disk-Read Only Memory), an MO (Magneto-Optical disk), an MD (Mini Disk), a DVD (Digital Versatile Disk) and the like, (c) cards such as an IC (Integrated Circuit) card (including a memory card) and an optical card, and (d) semiconductor memories such as a mask ROM, a EPROM (Erasable Programmable ROM), a Flash ROM and the like.

As mentioned above, according to the present invention, a data transmitter including: a first communication section for performing wireless data communication by an infrared ray according to IrDA Standard; a second communication section for performing, by the infrared ray, wireless data communication that does not comply with the IrDA Standard; and a switching section that switches between a process performed by the first communication section and a process performed by the second communication section, the second communication section including: a management information transmitting section for transmitting, in response to a user's instruction for data transmission, management information for managing transmission target data; a communication capability information receiver section for receiving, from a device that has responded to the transmission of the management information, communication capability information indicating communication capability (communication capacity, communication performance, communication ability or communication conditions) of the device; and a data transmitting section for transmitting a packet including the transmission target data, on the basis of the communication capability information.

In the communication complying with the IrDA Standard, the data transmission is performed after a process in which the destination device is searched. However, in infrared communication, the user often transmits data in the state where the light emitting section of the transmitting device is caused to face the light receiving section of the receiving device by the user himself/herself. In this case, the process for searching another communication device is not necessarily required.

Accordingly, the above arrangement includes the switching section that switches between a transmission process, according to the IrDA Standard, performed by the first communication section and a process, which does not comply with the IrDA Standard, performed by the second communication section.

This second communication section transmits the management information for managing the transmission target data in response to the user's data transmission instruction. When communication capability information indicating communication capability of the device that has responded to the transmission of the management information is received, the second communication section transmits a packet including the transmission target data on the basis of this communication capability information. Namely, if there is a device responding to the transmission of the management information, the second communication section determines that the second communication section can communicate with this device and sends the transmission target data to this device. Accordingly, because the communication performed by the second communication section does not carry out a process for searching the destination device, the communication time can be shortened compared with time for the communication, which complies with the IrDA Standard and needs the search process.

In other words, if the process performed by the first communication section and the process performed by the second communication section are switched according to the necessity of the process searching the destination device, the communication time can be shortened. Thus, when this search process is unnecessary, the second communication section carries out infrared communication skipping the search process. As the result, the communication time can be shortened compared with time required by the conventional infrared communication device.

According to a data receiver for receiving data wirelessly from the data transmitter, the data receiver including: a communication capability information transmitting section for transmitting, to the data transmitter, the communication capability information when the data receiver receives the management information, the communication capability information indicating the communication capability of the data receiver; and a data receiver section for receiving data transmitted from the data transmitter wirelessly, substantially the same effect as the data transmitter explained above can be attained.

According to a communication system including: the data transmitter; and a data receiver including (a) a communication capability information transmitting section for transmitting, to the data transmitter, the communication capability information when the data receiver receives the management information, the communication capability information indicating the communication capability of the data receiver and (b) a data receiver section for receiving data transmitted from the data transmitter wirelessly, substantially the same effect as the data transmitter explained above can be attained.

The second communication section may carry out communication by controlling an infrared light receiving/emitting module for the IrDA Standard.

The infrared light receiving/emitting module for the IrDA Standard is a mass-produced device and can be obtained at low cost. Accordingly, if the infrared light receiving/emitting module for the IrDA Standard is used not only in the first communication section but also in the second communication section, production cost of the data transmitter can be reduced.

Further, the switching section may (i) cause the second communication section to perform a process when a user's transmission prosecution command is inputted and (ii) switch to a process performed by the first communication section when the communication capability information receiver section has not received the communication capability information within a predetermined time after the transmission of the management information from the management information transmitting section.

According to this arrangement, firstly the process is carried out by the second communication section. When the communication capability information receiver section has not received the communication capability information within the predetermined time in the process performed by the second communication section, the switching section switches to the communication performed by the first communication section. Because this gives priority to the process performed by the second communication section, it becomes possible to cause the first communication section to communicate only when the process for searching the destination device is necessary.

The data transmitter may include: a notification section, which, when the communication capability information receiver section has not received the communication capability information within a predetermined time after the transmission of the management information from the management information transmitting section, notifies the user that no device capable of communicating with the second communication section exists in a region within a communication range.

According to the arrangement mentioned above, it is notified to the user that no device capable of receiving data transmitted by the second communication section exists in the region within the communication range, when the communication capability information receiver section has not received the communication capability information within the predetermined time after the transmission of the management information; the management information transmitted from the management information transmitting section. This makes it possible for the user, when there is no device to which the data transmission is possible in the region within the communication range, to acknowledge for sure the fact that no device capable of receiving the data exists in the region within the communication range. The acknowledgement is possible after the predetermined time from the input of the transmission prosecution command has elapsed.

An arrangement of the present invention may include: a management information transmitting section for transmitting, in response to user's data transmission instruction, management information indicating information for managing transmission target data; a communication capability information receiver section for receiving, from another communication device that has responded to the transmission of the management information, communication capability information indicating communication capability of the another communication device; a judging section for judging whether or not the communication capability information receiver section has received the communication capability information within a predetermined time after the transmission of the management information; and a data transmitting section for transmitting, to the another communication device, the transmission target data when it is judged that the communication capability information receiving section has received the communication capability information within the predetermined time.

Further, an arrangement of the present invention, in addition to the arrangement mentioned above, may include: an IrDA Standard communication processing section, which, in a case where it is determined that the communication capability information receiver section has not received the communication capability information within the predetermined time, (i) carries out, according to the IrDA Standard, a process for searching a further other communication device and establishment of connection with the further other communication device and (b) transmits the transmission target data to the further other communication device with which the connection is established.

An arrangement of the present invention may include: a notification section, which, when it is judged that the communication capability information receiver section has not received the communication capability information within the predetermined time, notifies the user that no device communicable is present in a region within a communication range.

The data transmitter or the data receiver may be realized by a computer. In this case, the scope of the present invention also includes a computer-readable recording medium recording the control program of a wireless terminal. The control program realizes the wireless terminal in the computer by causing the computer to serve as each section explained above.

This invention is not limited to the embodiments explained above, but can be varied in many ways without departing from the scope of the appended Claims. The present invention also covers all the embodiments that can be attained by accordingly combining technical means disclosed in the embodiments explained above.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A data transmitter comprising:
a first communication section performing wireless data communication by an infrared ray according to IrDA Standard;
a second communication section performing, by the infrared ray, wireless data communication that does not comply with the IrDA Standard; and
a switching section that switches between a process performed by said first communication section and a process performed by said second communication section,
said second communication section including:
a management information transmitting section transmitting, in response to a user's instruction for data transmission, management information for managing transmission target data;
a communication capability information receiver section receiving communication capability information indicating communication capability of a device that has responded to the transmission of said management information, wherein the communication capability information is transmission speed information; and
a data transmitting section transmitting a packet including the transmission target data, on the basis of the communication capability information, wherein: said switching section (i) causes said second communication section to perform a process when a user's transmission prosecution command is inputted and (ii) switches to a process performed by said first communication section when said communication capability information receiver section has not received said communication capability information within a predetermined time after the transmission of said management information from said management information transmitting section.

2. The data transmitter as in claim 1, wherein:
said second communication section carries out communication by controlling an infrared light receiving/emitting module for the IrDA Standard.

3. The data transmitter as in claim 1 comprising:
a notification section, which, when said communication capability information receiver section has not received said communication capability information within a predetermined time after the transmission of the management information from said management information transmitting section, notifies the user that no device capable of communicating with said second communication section exists in a region within a communication range.

4. A communication system comprising:
said data transmitter as in claim 1; and
a data receiver including (a) a communication capability information transmitting section for transmitting, to said data transmitter, the communication capability information when the data receiver receives said management information, the communication capability information indicating the communication capability of the data receiver and (b) a data receiver section for receiving data transmitted from the data transmitter wirelessly.

5. A computer-readable medium encoded with a data receiver control program operating the data receiver as in claim 4, the data receiver control program causing a computer to serve as each section of the data receiver.

6. A computer-readable medium encoded with software comprising a data transmitter control program operating the data transmitter as in claim 1, the data transmitter control program causing a computer to serve as each section of the data transmitter.

7. The data transmitter as in claim 1, wherein the communication capability information is substantially a maximum acceptable transmission speed information.

8. An infrared data transmitter comprising:
a management information transmitting section transmitting, in response to a user's data transmission instruction, management information indicating information for managing transmission target data;
a communication capability information receiver section receiving communication capability information indicating communication capability of another communication device that has responded to the transmission of said management information, wherein the communication capability information is transmission speed information;
a judging section judging whether or not said communication capability information receiver section has received said communication capability information within a predetermined time after the transmission of the management information;
a data transmitting section transmitting, to said another communication device, the transmission target data when it is judged that said communication capability information receiving section has received said communication capability information within the predetermined time; and
an IrDA Standard communication processing section, which, in a case where it is determined that said communication capability information receiver section has not received said communication capability information within the predetermined time, (a) carries out, according to the IrDA Standard, a process for searching a further other communication device and establishment of connection with the further other communication device and (b) transmits the transmission target data to the further other communication device with which the connection is established.

9. The infrared data transmitter as in claim 8, comprising:
a notification section, which, when it is judged that the communication capability information receiver section has not received said communication capability information within the predetermined time, notifies the user that no device communicable is present in a region within a communication range.

10. The data transmitter as in claim 8, wherein the communication capability information is substantially a maximum acceptable transmission speed information.

11. An infrared data transmitter comprising:
a management information transmitting section for transmitting, in response to a user's data transmission instruction, management information indicating information for managing transmission target data;
a communication capability information receiver section receiving communication capability information indicating communication capability of another communication device that has responded to the transmission of said management information, wherein the communication capability information is transmission speed information;
a judging section judging whether or not said communication capability information receiver section has received said communication capability information within a predetermined time after the transmission of the management information;
a data transmitting section transmitting, to said another communication device, the transmission target data when it is judged that said communication capability information receiving section has received said communication capability information within the predetermined time; and
a switching section (i) causing a second communication section to perform a process when a user's transmission prosecution command is inputted and (ii) switching to a process performed by said first communication section when said communication capability information receiver section has not received said communication capability information within a predetermined time after the transmission of said management information from said management information transmitting section.

* * * * *